A. SCHALLER.
ADJUSTABLE HEADLIGHT FOR AUTOMOBILES.
APPLICATION FILED FEB. 12, 1915.
1,172,488.
Patented Feb. 22, 1916.
2 SHEETS—SHEET 1.
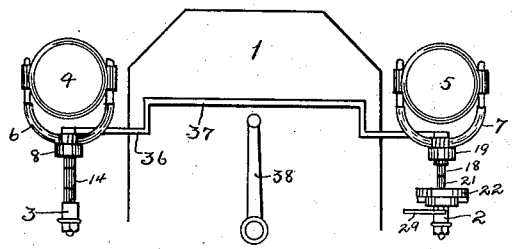
Fig 1
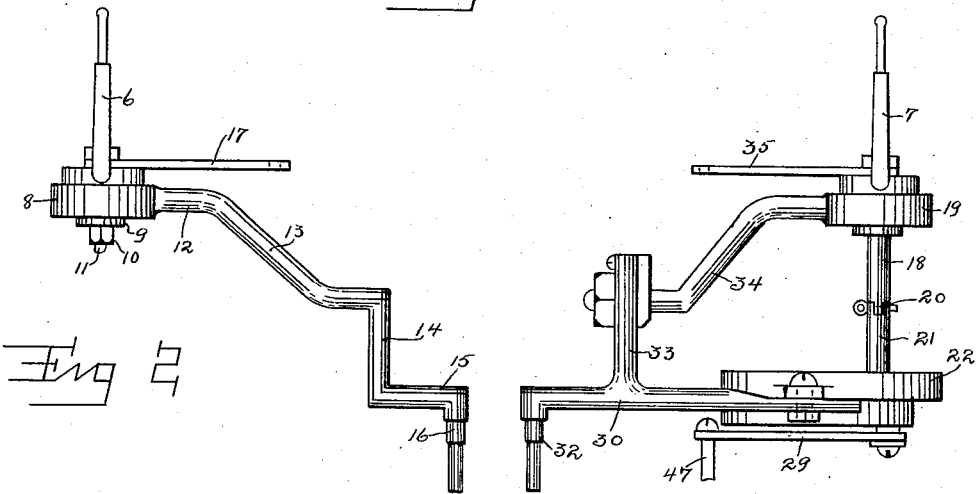
Fig 2
Fig 3
Fig 4
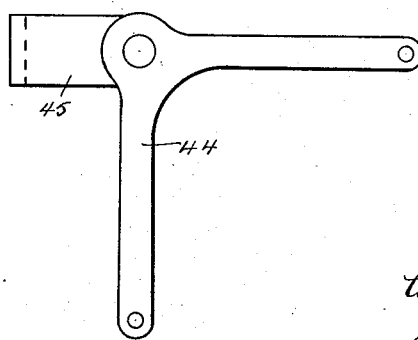
WITNESSES
INVENTOR
Anton Schaller
BY
Arthur Phelps Marr
ATTORNEY A. SCHALLER.
ADJUSTABLE HEADLIGHT FOR AUTOMOBILES.
APPLICATION FILED FEB. 12, 1915.
1,172,488.
Patented Feb. 22, 1916.
2 SHEETS—SHEET 2.
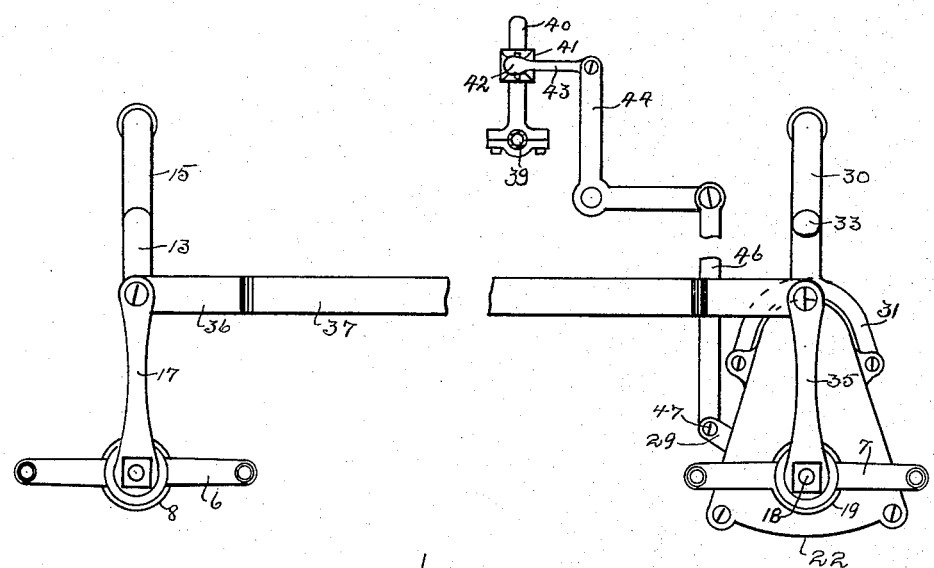
Fig 5
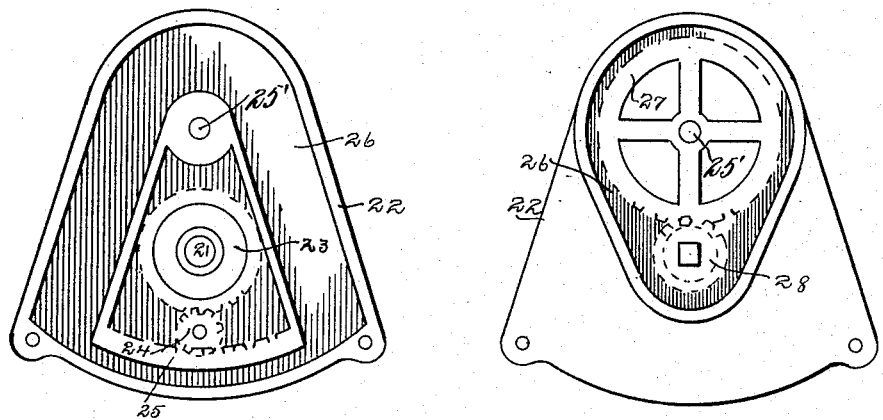
Fig 6
Fig 7
WITNESSES:
G. E. S. Marr.
H. D. Matchett.
INVENTOR
Anton Schaller
BY
Arthur Phelps Marr
ATTORNEY

UNITED STATES PATENT OFFICE.

ANTON SCHALLER, OF NEW YORK, N. Y.

ADJUSTABLE HEADLIGHT FOR AUTOMOBILES.

1,172,488.     Specification of Letters Patent.     Patented Feb. 22, 1916.

Application filed February 12, 1915. Serial No. 7,673.

*To all whom it may concern:*

Be it known that I, ANTON SCHALLER, a citizen of the United States, and resident of the borough of Manhattan, city, county, and State of New York, have invented certain new and useful Improvements in Adjustable Headlights for Automobiles, of which the following is a specification.

The device, the subject of this invention is intended as a means whereby the headlights of an automobile may be turned, or adjusted to follow the desired course of the car.

With an ordinary stationary headlight an automobile making a sharp turn, the operator will find that his eyes are directed to the unilluminated portion of the road, and that when the car is actually turning no advanced illumination can be obtained from the lamps that are on the car. My idea then is to connect the headlights, the particular road illuminating lamps with the steering column so that each motion of the hand-wheel will be accompanied by a motion of the headlights, and that the lights on a sharp turn will upon the movement of the hand-wheel be directed into the portion of the road that the car is to traverse.

My method of operation and the means for accomplishing the results will be found fully set forth in the specification which follows.

The following is what I consider the best means for carrying out this invention and the accompanying drawings assist with the specification in setting forth one form of my invention.

Figure 1 shows in elevation a portion of the front of a car with my adjustable headlights in position. The remaining figures are on a larger scale. Fig. 2 shows one of the side brackets, and this figure is in side elevation. Fig. 3 also in side elevation shows the opposite side bracket. Fig. 4 shows a direction changing lever. Fig. 5 is a plan view. Fig. 6 is a plan view of a part with the top removed. Fig. 7 is the reverse plan view of the part shown in Fig. 6.

Similar reference numerals indicate like parts in all of the figures where they appear.

It will be noted that the standard parts of an automobile that I describe in connection with my invention are not shown nor set forth in detail in the specification for the reason that I believe that all standard parts are well understood and need no explanation. I will therefore merely refer to such parts by a reference numeral when it is necessary to mention them.

At 1 I indicate the front of an automobile, and at 2 and 3 the lamp supports or brackets. 4 and 5 show a pair of ordinary lamps, that may be electric lamps or gas or oil.

At 6 and 7 I show the lamp receiving members which are formed with a plurality of upward projections or horns between which the lamp is received and a downward projection. In my invention the downward projection is removed and a square hole is produced in the lower portion of the lamp support, which in each instance is received upon a squared plug. In the bracket shown in Fig. 2 this plug continues through a suitable bearing 8, which may be a ball bearing, and is held in position by a washer 9 and nut 10, the lower end of the plug being indicated at 11. From the bearing 8 I arrange an inward projection 12, which continues for a short distance on a horizontal plane to be dropped on an angle as indicated at 13, dropping again vertically as indicated at 14. It terminates in a horizontal portion indicated at 15, to which the securing bolt 16 is attached. This securing bolt may be formed integral with the arm member shown at 12, 13, and 14 and 15, and will be received in the lamp bracket 3 which is usually provided on a car.

Connected under the lamp and to the plug 11 I show an inwardly extending lever member 17 for a purpose that shall appear later. The opposite bracket is a little more complicated in its construction. This bracket is received on a plug indicated at 18, rotatably retained in a suitable bearing 19. The end of the plug 18, is by means of a joint 20 connected to a shaft 21 in axial alinement with the plug 18.

The shaft 21 enters the casing 22 where it is supported upon the gear 23 in mesh with a pinion 24, which is in turn partially rotated by a sector 25. Through the sector the shaft 21 extends and it will be understood that the sector 25 is limited in its rotary movement by the ability of the sector to be moved in relation to the shaft 21. For this reason I have constructed my sector in the nature of a frame as shown in Fig. 6.

Within the casing 22 I arrange a centrally disposed perforated abutment or dividing wall 26, which serves as a bearing for the lower end of the shaft 21, and for the lower end of the shaft supporting the pinion 24.

On the under side of the abutment 26 a second chamber is formed in which I arrange a gear 27 connected to the shaft 25' upon which the sector 25 is mounted and which serves as a rotating means for the sector. A second pinion 28 is also arranged in this chamber and is in mesh with the gear 27. The shaft from this pinion passes through the lower cover of the chamber and upon the end of the shaft I arrange a lever 29.

It will be noted that the casing 22 is supported by means of an arm 30, the outer end of which is forked or U shaped as shown at 31. To this arm 30 I secure, or form integral therewith, a stud 32 which is received and secured into an ordinary lamp bracket 2, and upwardly extending from the member 30 is a vertical standard 33 into which I secure a bent arm 34, one end of which assists in supporting the bearing member 19.

Secured under the lamp and to the plug 18 I arrange a lever 35 similar in every respect to the lever 17 previously described, and between these levers 17 and 35 I extend a bar 36, the center portion of which is raised as indicated at 37 to allow for the rotation of the starting handle 38.

Arranged upon the lower end of the steering column 39 is a short lever 40 into which I secure a lug 41 provided with a universal joint 42, this lug 41 is adjustable on the member 40.

To the universal joint 42 I connect an arm 43 which is pivotally engaged with the crank member shown in Fig. 4, and indicated at 44. The pivot of this member is by means of a bracket 45 secured to a convenient portion of the chassis. To the other end of the member 44 I secure a bar 46 which terminates in a pivot 47, rotatably secured in the lever 29.

By this construction it will be observed that any motion of rotation of the steering column 35 will be accompanied by a partial rotation of both of the lamps. The extent of motion of the lamps is determined by the relative size of the pinions 24 and 28, the gears 23 and 27, and the sector 25, which are provided for the express purpose of decreasing or increasing the amount of movement of the lamps as conditions may require.

It is obvious that I may move only one of the lamps. This should be the lamp arranged on the left side and supported by the bracket shown in Fig. 3. To accomplish this the bar 36 and the rotating mechanism of the bracket shown in Fig. 2 may be omitted with their loss of function. The shape of the casing 22 may be altered to suit the ideas or desires of the maker, and other modifications may be made within the scope of the appended claims without departing from the principle or sacrificing the advantages of this invention.

Having carefully and fully described my invention what I claim and desire to secure by Letters Patent is:

1. A device of the character described comprising a plurality of rotatable and vertical shafts out of alinement, a lever upon one of said shafts, means connected with a steering column for operating said lever, a pinion upon said shaft, a gear upon another of said shafts and in mesh with said pinion, a sector having an aperture and secured upon said second shaft, and a third shaft arranged within the aperture of said sector and a gear upon said shaft operated by said sector and a lamp bracket upon the last mentioned shaft all combined for joint operation as herein specified.

2. A device for directing the rays of a headlight comprising a casing having a centrally disposed and perforated dividing wall arranged therein, a plurality of shafts out of alinement, one end of each of said shafts being supported by said barrier, and a plurality of gears and pinions and a sector in mesh with each other and adapted to rotate said shafts, one of said shafts serving to limit the extent of movement of said sector as herein specified and for the purpose set forth.

Signed at New York city, county and State of New York this 25th day of January, 1915, in the presence of these two witnesses.

ANTON SCHALLER.

Witnesses:
GEORGE CLAUTER,
ARTHUR PHELPS MARR.

Copies of this patent may be obtained for five cents each, by addressing the "Commissioner of Patents, Washington, D. C."